Patented July 20, 1926.

1,592,820

UNITED STATES PATENT OFFICE.

SIDNEY M. CADWELL, OF LEONIA, NEW JERSEY, ASSIGNOR TO THE NAUGATUCK CHEMICAL COMPANY, OF NAUGATUCK, CONNECTICUT, A CORPORATION OF CONNECTICUT.

TREATMENT OF RUBBER WITH ALIPHATIC DIAMINES, AND THEIR DERIVATIVES, AND PRODUCTS OBTAINED THEREBY.

No Drawing.     Application filed July 10, 1923. Serial No. 650,721.

This invention relates to the treatment of rubber with aliphatic diamines and their derivatives. It is more particularly directed to the use of a saturated diamine and its derivatives as accelerators of vulcanization; and to products obtained thereby.

The principal object of the present invention is to provide a simple process of the kind described employing an inexpensive highly active material which will cause acceleration of vulcanization when only small quantities are used.

The invention accordingly consists of a process for vulcanizing rubber which comprises treating rubber with a substance containing ethylene diamine by which is meant ethylene diamine itself or one of its derivatives, and vulcanizing the rubber; and the vulcanized rubber so obtained.

In carrying out the invention in its preferred form, 100 parts of rubber, 10 parts of zinc oxide, 3 parts of sulphur and 0.25 parts of the condensation product of ethylene diamine and heptaldehyde are mixed by milling in the usual manner and vulcanized for sixty minutes in a mold under 40 lbs. steam pressure whereupon a well vulcanized product is secured.

As another example 100 parts of rubber, 100 parts of zinc oxide, 7 parts of sulphur and 1.5 parts of the condensation product of ethylene diamine and heptaldehyde are milled together in the usual manner and vulcanized with air under pressure. If 1 hr. is employed to heat the air in the vulcanizer to 275° F., thereafter the temperature is maintained at 275° F. for 1 hr. whereupon a satisfactory vulcanized product is obtained.

It will be observed that vulcanization in a mold in open air or in steam or various other known types of vulcanization may be employed. Instead of the heptaldehyde condensation product of ethylene diamine various other reaction products of ethylene diamine may be employed. Among the aldehyde reaction products it has been found that when either the reaction product of formaldehyde or acetaldehyde and ethylenediamine are employed in about the proportions given above, similarly good results are obtained. The acetaldehyde condensation product of ethylenediamine has been found to be a more active accelerator than the two other reaction products mentioned and is also less expensive but it has a slightly greater tendency to prevulcanize upon milling than the other two.

Smaller quantities than 0.25 parts in the above compound have been employed with good results. Larger quantities may be employed if desired.

Ethylene diamine hydrobromide, a white crystalline material is another reaction product of ethylenediamine which may be similarly employed. If 0.5 part of this material is used in the compound given in the first example satisfactory vulcanization is secured.

The heptaldehyde condensation product of ethylene diamine is prepared by adding ethylene diamine hydrate slowly with stirring to the calculated amount of heptaldehyde. 1 molecular weight of ethylene diamine requires 2 molecular weights of heptaldehyde. After the reaction has completed itself the oil which rises to the top is separated and used as an accelerator.

Another derivative of ethylene diamine is ethylene thiourea which may be formed according to a well-known method. Using this material 100 parts of rubber, are mixed with 10 parts of zinc oxide, 3 parts of sulphur, 0.5 part of ethylene thiourea. Vulcanization is satisfactorily accomplished by heating the mixture under 40 lbs. steam pressure for 1 hr.

It is to be noted that the examples given above include derivatives of ethylene diamine. These derivatives are preferred particularly where the material is introduced into the rubber by milling, or by otherwise working so as to heat it for the reason that ethylene diamine is relatively volatile and, in the gaseous form, somewhat toxic. The substance resulting from its reaction with other materials such as those mentioned above produce materials which are substantially free from toxic effect. However ethylene diamine may be used as such in many cases. The following are examples of such use:

Water-soluble ethylene diamine and its water-soluble derivatives such as the hydrobromide and the acetaldehyde condensation product may be added to latex in the proportion of one part of ethylene diamine, 3 parts of sulphur and 100 parts of rubber in the form of latex. After removing the water in the latex in any desired manner the resulting rubber will vulcanize in the mold in 60 minutes under 40 lbs. steam pressure or in air in one hour at 286° F. Water insoluble derivatives such as heptaldehyde condensation products may be added to the latex in the form of an emulsion. It will be noted that ethylene diamine accelerates well in the absence of zinc oxide to produce a transparent rubber.

As many apparently widely different embodiments of this invention may be made without departing from the spirit thereof, it will be understood that I do not intend to limit myself to the specific embodiment herein set forth except as indicated in the appended claims.

Having thus described my invention, what I claim and desire to protect by Letters Patent is:

1. A process for treating rubber which comprises subjecting rubber to the reaction product of ethylene diamine and an open chain aldehyde, and vulcanizing the rubber.

2. A process for treating rubber which comprises adding thereto a condensation product of ethylene diamine and an open chain aldehyde containing more than one carbon atom in the chain, and vulcanizing the rubber.

3. A process for treating rubber which comprises subjecting rubber to the condensation product of heptaldehyde and ethylenediamine, and vulcanizing the rubber.

4. A process for treating rubber which comprises mixing rubber, zinc oxide, sulphur and the condensation product of ethylene diamine and heptaldehyde, and vulcanizing the rubber in a mold for 60 minutes under 40 lbs. steam pressure.

5. A process for treating rubber which comprises mixing therewith a condensation product of ethylene diamine and an open chain aldehyde having from 2–7 carbon atoms in the open chain, and vulcanizing the rubber.

6. A vulcanized rubber derived from rubber treated with a condensation product of ethylene diamine and an open chain aldehyde.

7. A vulcanized rubber derived from rubber treated with the condensation product of ethylene diamine and an open chain aldehyde containing a plurality of carbon atoms in the open chain.

8. A vulcanized rubber derived from rubber treated with the reaction product of ethylenediamine and a straight chain aldehyde.

9. A vulcanized rubber derived from rubber treated with the condensation product of heptaldehyde and ethylene diamine.

10. A vulcanized rubber derived from rubber mixed with zinc oxide, sulphur and the condensation product of ethylene diamine and heptaldehyde.

Signed at New York, New York, this 6 day of July, 1923.

SIDNEY M. CADWELL.